June 2, 1959
F. M. BRAWAND
2,889,167
DRAFT HOOK
Filed Feb. 3, 1958
5 Sheets-Sheet 1
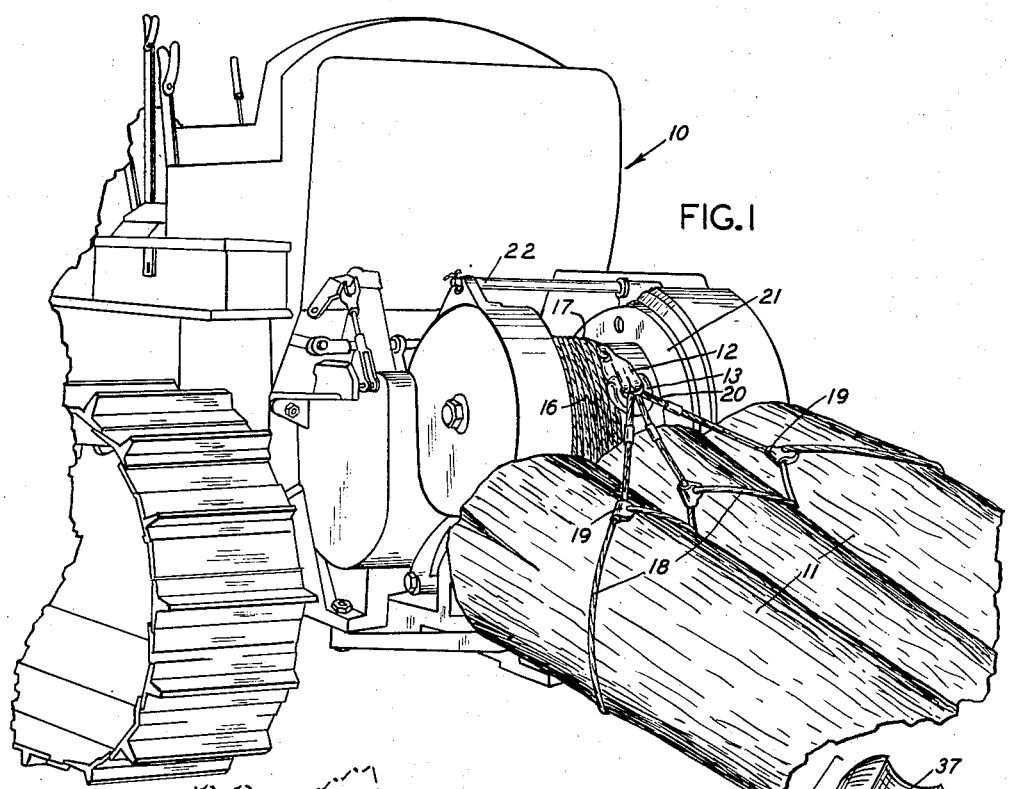
FIG.1
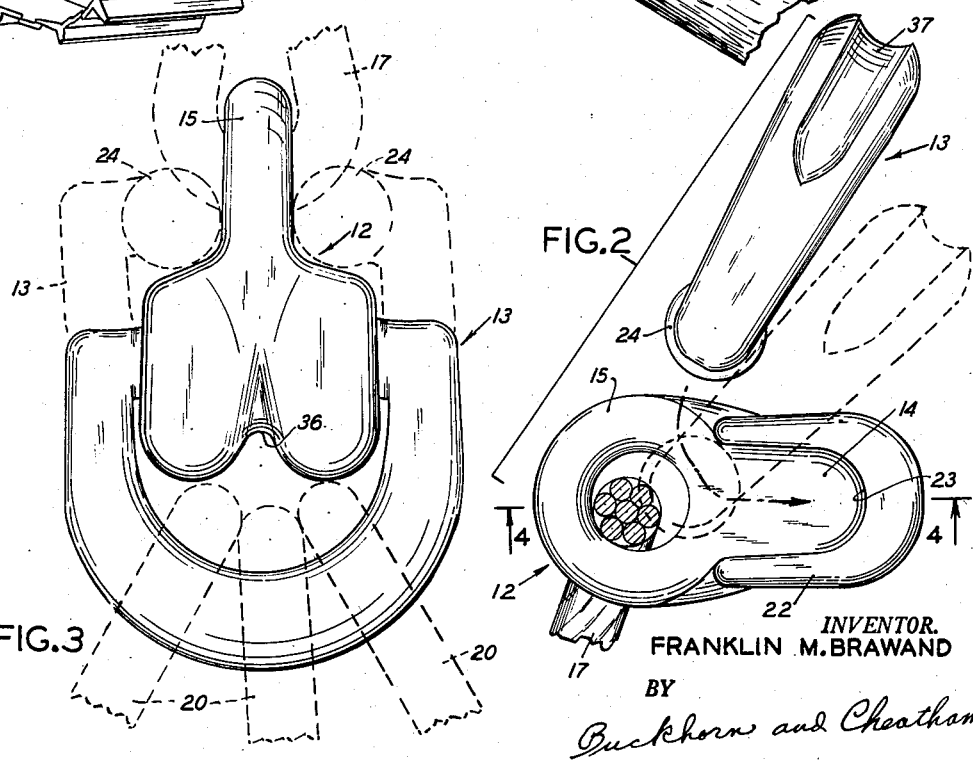
FIG.2
FIG.3
INVENTOR.
FRANKLIN M. BRAWAND
BY
Buckhorn and Cheatham
ATTORNEYS

INVENTOR.
FRANKLIN M. BRAWAND

June 2, 1959   F. M. BRAWAND   2,889,167
DRAFT HOOK
Filed Feb. 3, 1958   5 Sheets-Sheet 3

INVENTOR.
FRANKLIN M. BRAWAND
BY
BUCKHORN, CHEATHAM & BLORE

ATTORNEYS

June 2, 1959     F. M. BRAWAND     2,889,167
DRAFT HOOK
Filed Feb. 3, 1958     5 Sheets-Sheet 4

INVENTOR.
FRANKLIN M. BRAWAND
BY
BUCKHORN, CHEATHAM & BLORE

ATTORNEYS

INVENTOR.
FRANKLIN M. BRAWAND
BY
BUCKHORN, CHEATHAM & BLORE

ATTORNEYS

United States Patent Office 2,889,167
Patented June 2, 1959

2,889,167

DRAFT HOOK

Franklin M. Brawand, Portland, Oreg.

Application February 3, 1958, Serial No. 713,052

8 Claims. (Cl. 294—82)

This application is a continuation in part of my co-pending application Serial No. 514,799, filed June 13, 1955, which is now abandoned.

The invention comprises a draft hook for attaching loads to a draft device, such as in the hoisting of sling-borne loads aboard a ship or the dragging of logs from the woods. The present invention is of particular utility in log-handling operations, but it is to be appreciated that it is adapted for use wherever a load is to be attached to a draft cable or other hauling means. A principal object of the present invention is to provide a draft hook which may be easily and quickly operated, either to attach or detach the load from the draft means, without danger to the operator and without danger of fraying or cutting through the load-supporting or draft cables.

A further object of the present invention is to provide a draft hook which may be wound up onto a winch drum along with adjacent portions of the draft cable and load cables. This feature makes the invention particularly useful in lumbering operations where logs are frequently dragged from the woods by means of choker cables detachably secured to the draft hook at the end of the draft cable which is wound upon a winch drum mounted upon a tractor. In such operations it is common to use a "log arch" towed behind the tractor, this device comprising wheeled or tracklaying supports and an intervening arch having a pulley and fairleads through which the draft cable extends. Logs are attached to the draft cable by means of choker cables and an arch hook attached to the draft cable, the choker cables being wrapped around the logs at one end. By means of this construction the leading ends of the logs may be lifted above the ground to the fairlead on the log arch. Log arches are expensive and not available to all operators, also they increase the length of the apparatus which must be moved through temporary roads bulldozed into the woods and frequently cause the operator to detach the load and move the trailing ends of the logs into alignment or otherwise shift the logs so that they can be taken through the woods. Sometimes the operator is forced to pay out the draft cable while the logs remain stationary and the tractor moves ahead, then winch the logs to the tractor. Known draft hooks frequently dropped choker cables during such operations. For these and other reasons, such as rough terrain, various operators prefer to hitch the logs directly to the tractor winch, dragging them from the woods in the manner which has come to be known as "bobtailing." Arch hooks or equivalent draft hook means as heretofore devised have caused complications in this type of operation, for the reason that, in order to be strong enough to support a full load, the hooks have been made quite bulky and elongated. Therefore, the arch hook could not be wound onto the cable drum in many instances, and the forward ends of the logs would drag on the ground, dig into the ground, and otherwise prevent forward progress. A principal object of the present invention is to provide a draft, or arch, or chocker, hook which may be wound up onto a winch drum or pulled through the fairleads of an arch to raise the forward ends of logs clear of the ground.

A further object of the present invention is to provide a device of the character described which may be separated into two component parts, a draft line terminal member and a load line holder, whereby operations may be performed much faster than formerly, as follows: For example, in hauling logs the owner may have one terminal member permanently secured to the draft cable on his winch, a pair of separable, interchangeably detachable load line holders and a number of sets of choker cables for securing the individual logs. When the tractor operator returns to the cutting area he will hand one of the load line holders to his helper after the helper has secured a load of logs to the draft line terminal by means of a second load line holder. Then while the tractor is going to the loading point and returning, the helper will set choker cables on a succeeding load of logs, place the choker cable terminal eyes in position on the second load line holder, and be ready instantly to secure the two parts together. Also after the load is released at the delivery point the hook and choker cables can be wound onto the drum clear of the ground, thus permitting the tractor to back up to turn around. This is possible only because the choker cables cannot become disengaged while the flexible hook passes around the drum.

A further object of the present invention is to provide a device of the character described which cannot be accidently separated while in use, and cannot twist itself into a position where undue strains are placed on one portion or another which might result in failure of the apparatus, but which can be rapidly and easily separated or secured together upon intelligent manipulation when strain is relieved.

The foregoing and other objects and advantages of the present invention will be more readily understood by reference to the following specification taken in connection with the accompanying drawing wherein like numerals refer to like parts throughout, and in which preferred embodiments of the present invention are described and illustrated.

In the drawings,

Fig. 1 is a partial view of a tractor hauling a load of logs by means of the present invention in the manner of operation known as "bobtailing";

Fig. 2 is a side view of one form of the present invention in separated condition and illustrating the manner of assembly;

Fig. 3 is a plan view of said one form of the present invention in assembled condition;

Figure 4:
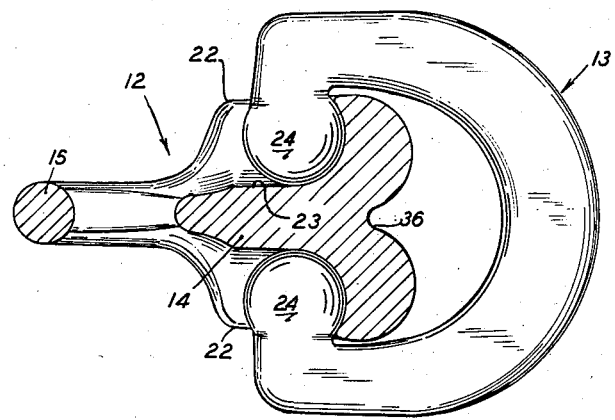
Fig. 4 is a plan view of said one form of the invention with the draft line terminal member shown in section substantially along the line 4—4 of Fig. 2.

The invention is illustrated in Fig. 1 in connection with a tractor 10 dragging a load of logs 11. The draft hook, comprising a rigid draft line terminal member 12 and a rigid load line holder 13, is illustrated in use. The terminal member 12 comprises a central partition 14 at one end and an eye 15 at its other end, the eye lying in alignment with the partition, and the member being permanently attached to the draft cable 16 by splicing an eye 17 onto the end of the cable extending through the eye 15. The logs 11 are attached by means of choker cables 18. Each choker cable is provided with a choker hook 19 which slides along the cable and which has a socket into which a ferrule on the end of the cable may be inserted to form a running noose which may be drawn up around the end of the log. The opposite ends of the choker cables are provided with spliced or otherwise formed eyes 20 through which the load line holder 13 may be inserted. The load line holder is mounted upon the terminal member and the draft cable 16 wound onto the winch drum 21. The relatively small, flat shape of the assembly, together with its articulation in the middle, permits the hook to be taken up onto the drum, passing beneath obstructions such as the bar 22 illustrated, or between the drum and the back wall of the winch, or through fairleads and over pulleys on a log arch, thus permitting the operator to raise the ends of the logs clear of the ground.

The terminal member 12 comprises a pair of U-shaped flanges 22 facing in opposite directions from the partition 14 and defining therewith a pair of oppositely facing niches extending away from the eye 15. The niches 23 are open at their ends adjacent the eye 15 and closed at their opposite ends. The niches are generally U-shaped in cross section and spherically rounded at their closed ends. The partition 14 tapers in thickness toward the eye 15.

The load line holder 13 comprises a bail-shaped body having its terminals turned inwardly toward each other and shaped as spherical knobs 24. The knobs 24 snugly fit the niches 23 and are spaced apart snugly to embrace the central partition 14 adjacent the closed ends of the niches. The bail is thus suspended from the terminal member by opposed ball-and-socket joints. The bail is preferable to open draft hooks since the choker cable eyes or equivalent members could slide off the open side of a hook, and the load is supported by both ends of the bail.

In a typical assembly as illustrated, the draft cable comprises one and one-eighth inch steel cable and the choker cables comprise seven-eighth inch steel cables. The opening through the eye 15 is approximately two inches in diameter and the diameter of the knobs 24 is slightly larger than the opening through the eye 15. It is to be understood that the draft hook may be made in other sizes for various sizes of cables and winches. The opening of the eye extends to a point slightly above the ends of the flanges 22. The ends of the flanges 22 facing toward the eye are rounded whereby the knobs 24 may pass through the gaps between the ends of the flanges and the bight of the draft cable eye 17 when properly manipulated. Looking at the assembly in plan, it will be seen that the knobs 24 overlap the cable eye, in the vertical sense, when they are being inserted and withdrawn. Insertion of the knobs is nevertheless possible because the knobs move diagonally into position as illustrated by the dash line arrow in Fig. 2, and because the knobs are spherical, the cable is round, and the cable is bent into a bight. Associating or disassociating movement is very easily and quickly accomplished when the members are manually held and moved properly, but during jostling, or slackening and then retightening of the cable when the hook is in use, it is practically impossible for separation accidentally to occur.

Figure 5:
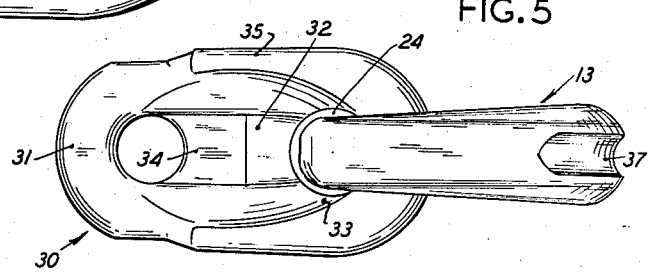
Fig. 5 is a side view of a second form of the present invention.
Figure 6:
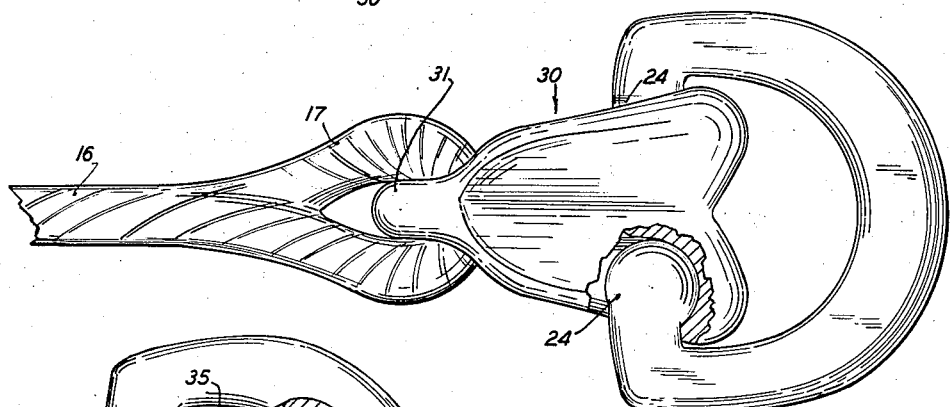
Fig. 6 is a plan view, partially broken away, of the form of the invention illustrated in Fig. 5.
Figure 7:
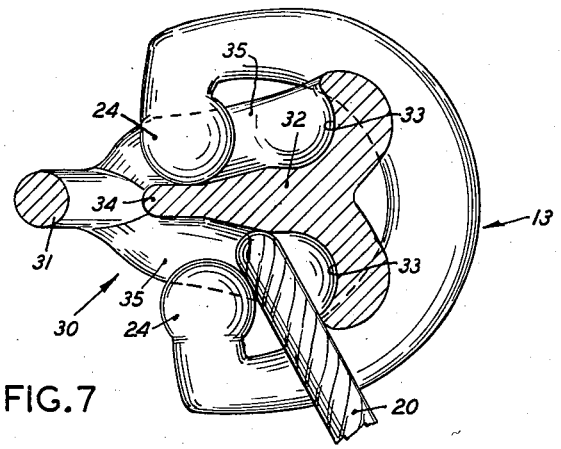
Fig. 7 is a partially broken away view of the modification illustrated in Figs. 5 and 6 and illustrating the method of attaching load line cables thereto in one manner of operation.
Figure 8:
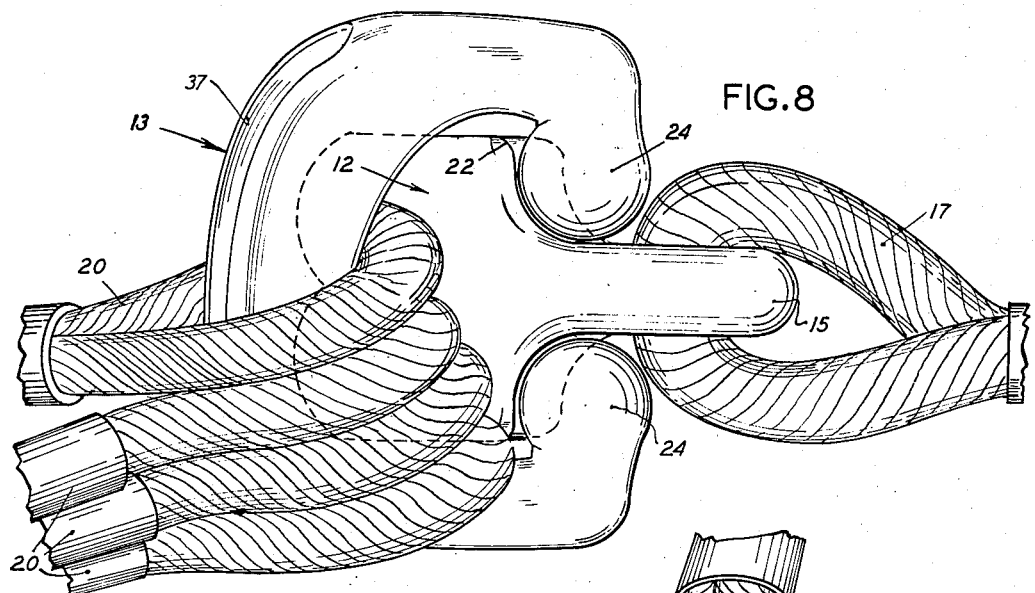
Fig. 8 is a view of the modification of Figs. 2, 3 and 4, showing the spherical knobs on the load line holder slipping past the shoulders on the flanges of the draft line terminal member and past the eye in the draft line cable.
Figure 9:
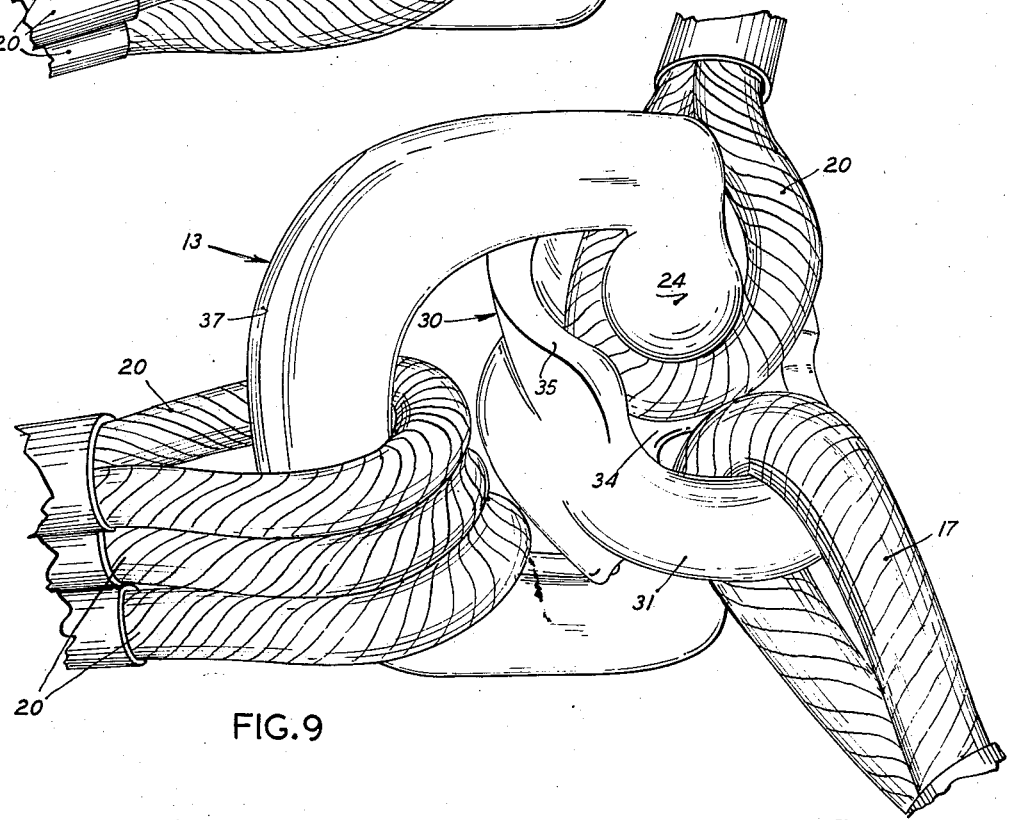
Fig. 9 is a view of the modification of Figs. 5, 6 and 7, showing a choker cable slipping past one of the spherical knobs on the load line holder.
Figure 10:
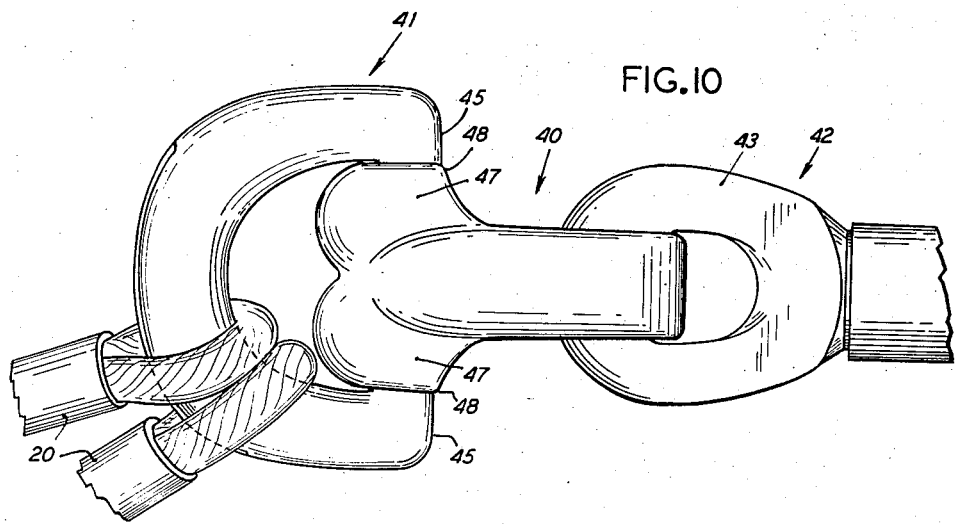
Fig. 10 is a plan view of a third form of the present invention, looking at the device as it might be laid out on the ground.
Figure 11:
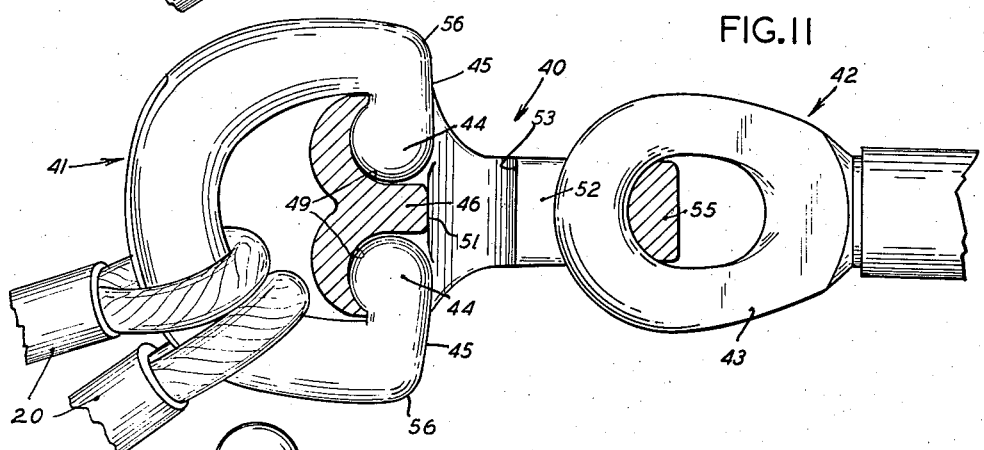
Fig. 11 is a similar view with a part broken away to show details.

The modified form of the invention disclosed in Figs. 5, 6 and 7 comprises a different form of terminal member 30 with which may be associated substantially the same load line holder 13. The terminal member is secured to a draft cable 16 by means of an eye 17 on the cable being passed through the eye 31 of the terminal member, as previously described. The terminal member is elongated and the partition therein comprises a thick portion 32 adjacent the closed ends of elongated niches 33, which closed ends are spherically formed as previously described. The partition has a thin portion 34 adjacent the eye 31, the transition between the two portions being gradual. The flanges 35 defining the walls of the niches taper from the closed ends of the niches toward the eye 31, but the depth of the niches remains substantially constant due to the taper of the central partition. The inner surfaces of the flanges flare outwardly toward the eye 31 whereby the niches are generally U-shaped in cross section with outwardly flaring walls in cross section in the intermediate portion of the terminal member. This arrangement is such that when the load line holder is swung toward one side and moved toward the eye 31, the knob 24 at one side can be withdrawn from the inner surfaces of the niche to an extent permitting passage of the knob through a choker cable eye 20, without entirely removing the holder from the terminal member. This operation permits the tractor driver to pick up widely scattered logs without requiring the helper completely to disassemble the draft hook each time that he adds a log to the load.

The modification of Figs. 10 to 14, inclusive, incorporates the same general principles in a hook having distinct advantages over the prior modifications. This form of the invention comprises a terminal member 40 of modified form which, after initial assembly, is permanently associated with a load line holder 41 of modified form and the draft device 42. The draft device could be the eye of a draft cable, as previously illustrated, but it is herein illustrated as the swivel eye 43 of a swivel device which may be attached to the end of a draft cable in the usual manner. The load line holder comprises a bail-shaped body having its terminals turned inwardly toward each other and shaped as spherical knobs 44, substantially as previously described. Preferably the upper edges 45 of the inwardly turned terminals are substantially straight, in alignment with each other and at right angles to the longitudinal axis of the hook and draft cable when suspended or otherwise aligned. The terminal member 40 is substantially the same member as previously described with the following differences: The central partition 46 is quite short, with its upper end substantially in alignment with the surfaces 45 when the device is assembled. The U-shaped flanges 47 are also quite short with their shoulder points 48 at the upper ends being substantially flush with the surface 45 when the device is in alignment. Therefore, the spherical knobs 44 fit into and substantially fill the niches 49. The terminal member 40 is provided with an inverted T-shaped or trefoil eye opening 51, the upright arm 52 of which is longer than the horizontal arm 53. The wall of the terminal eye surrounding the opening 51 is of varying thickness, there being portions 54 adjacent the trefoil arms 53 which are relatively thin, having a thickness slightly less than the distance between the confronting surfaces of the spherical knobs 44, and an upper portion 55 adjacent the trefoil arm 52 of substantially the same thickness.

Figure 12:
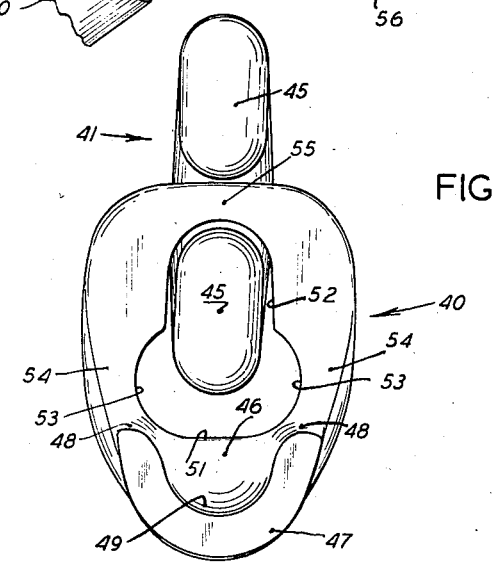
Fig. 12 is a partial view of the third modification prior to final assembly of the component parts thereof, showing the method of assembling and disassembling the draft line terminal member and load line holder.

The terminal member 40 and the load line holder 41 are cast as two separate parts and are then assembled and remain assembled during use of the device. Assembly is achieved by turning the load line holder into alignment with the longitudinal or vertical axis of the terminal member and slipping the thin eye portion 55 through the gap between the spherical knobs 44, as illustrated in Fig. 12. The load line holder may then be turned and dropped into its position of use with the spherical knobs resting in the niches. Thereafter, when a cable is spliced to the eye of the terminal member 40, or a swivel eye 43 cast as an integral member embracing the thin portion 55, as illustrated, the vertical arm of the trefoil opening is shortened and the load line holder is blocked from being turned into the position illustrated in Fig. 12, whereby separation of the component parts at this point is positively prohibited.

Figure 13:
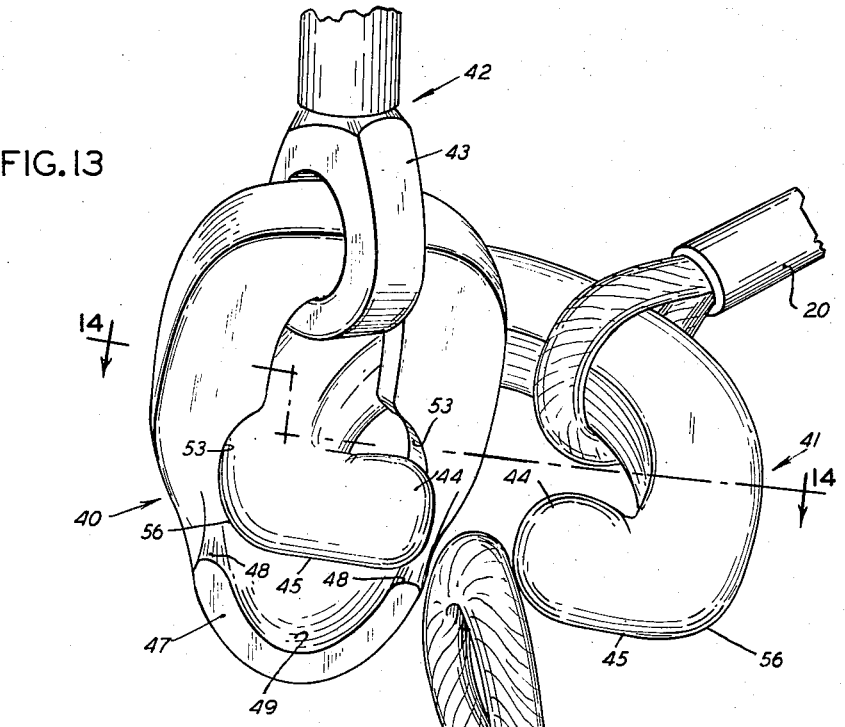
Fig. 13 is a view in perspective of the third modification showing the relative positioning of parts to permit the association and disassociation of choker cables therewith and therefrom.
Figure 14:
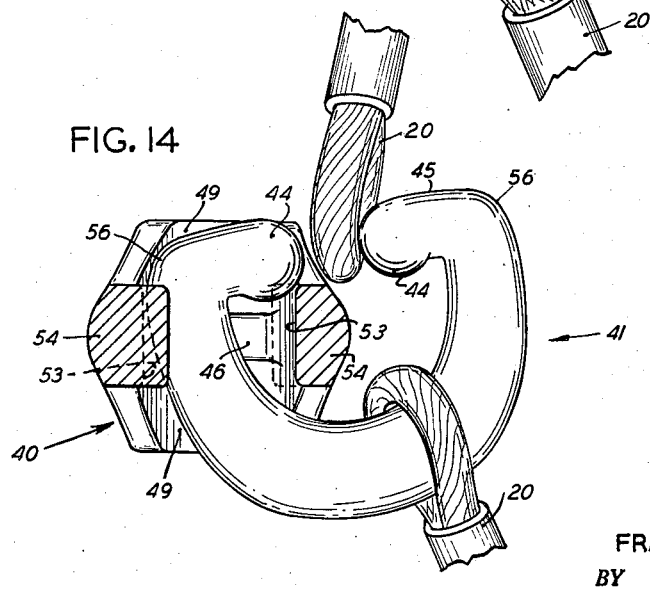
Fig. 14 is a horizontal section, on a smaller scale, taken substantially along line 14—14 of Fig. 13.

The third modification is illustrated in use in Figs. 13 and 14 wherein a further advantage becomes apparent. Fig. 13 illustrates the device in upright or suspended condition with the terminal member 40 swinging below the draft swivel 43, which is the usual state of the device when load cables are to be slipped onto or removed from the load line holder. In this position the load line holder may be lifted slightly to clear the knobs 44 from the niches 49, then the load line holder may be returned to a horizontal position of use and one end thereof pushed into the groove formed by the lower arms of 53 of the trefoil eye opening. The space between the inner surfaces of the thin portions 54 is slightly less than the overall length of the inwardly turned terminal of the load line holder and the thin portions 54 are relatively thin along their vertical edges and thick in the middle. When the load line holder reaches the position illustrated in Figs. 13 and 14, the spherical knob 44 at one end rests upon the shoulder 48 of one end of a flange 47 at one side of the terminal member 40; the elbow portion 56 of the holder adjacent the said knob 44 is confined within the trefoil arm 53 on the opposite side of the terminal member; and the intermediate portion of the load line holder rests upon the shoulder 48 of the other flange 47 at the first mentioned side of the terminal member. Being thus supported the other spherical knob 44 of the load line holder is spaced from the outer surface of the terminal member and held there, with the terminal member in substantially horizontal position. The other knob 44 is spaced from the thin edge of the terminal member a sufficient distance to permit insertion or withdrawal of the choker (or load) cables 20. The operator is thus free to use both hands to manipulate the choker cables, being relieved of the necessity of holding the load line holder with one hand while manipulating the choker cable with the other hand as required by the modification of Figs. 4 to 7 inclusive, and being relieved of the necessity of separating the load line holder from the terminal member as required by the modification of Figs. 2 and 3. He may thus use two hands on each choker cable to twist it into position or to otherwise bring it into association or to remove it. After the load or choker cables are arranged as desired, either by association or disassociation, a slight withdrawal of the load line holder releases it to fall back into position with the spherical knobs 44 seated in the niches 49.

When the load line holder is positioned as described in the preceding paragraph it is impossible to remove it from the terminal member for the reason that the terminal of the holder is longer than the space between the confronting surfaces of the arms 53 of the opening and the portion 54 of the eye is thick in the middle. Any attempt to separate the holder by pulling the intermediate portion thereof away from the terminal member results in one knob jamming against the outer surface of portion 54 and the other knob jamming against the inner surface of portion 54.

With all forms of the device it is impossible for the choker cables to become pinched and worn between sharp-edged portions of the device, the outer surfaces of the terminal members being rounded, and the bail being so close thereto that the cables cannot enter tight corners. The device is illustrated in Fig. 3 as holding three choker cables but it will be readily appreciated from examination of Fig. 4 that four cables of the same size may be accommodated. Even thought it might be a tight fit, the knobs 24 can be fully inserted into the niches while the holder remains at an angle toward the side, as illustrated in Fig. 2. Thereupon, when the tractor moves the device will be straightened out and the fourth cable will enter the saddle 36 between the niches. The holders likewise are thicker toward their middles than at their ends whereby more snugly to fit within choker cable eyes and lessen chafing. Preferably, the weight of the device is lessened by grooving the exterior surfaces of the holders, as indicated at 37.

Having illustrated and described several embodiments of the present invention, it should be apparent to those skilled in the art that the same permits of other modifications in arrangement and detail. I claim as my invention all such modifications as come within the true spirit and scope of the appended claims.

I claim:

1. A draft hook comprising a rigid draft line terminal member and a rigid load line holder mounted thereon, said terminal member comprising a central partition at one end and an eye at its other end for securing the member to a draft element, said partition and eye being in alignment with each other, and a pair of U-shaped flanges extending outwardly in opposite directions from said partition and defining therewith a pair of oppositely facing niches of U-shape in cross section, said niches being open at their ends adjacent said eye and closed at their opposite ends, and said holder comprising a bail having its terminals pointing inwardly toward each other and spaced apart so as to permit snug entry of said partition between the tips thereof, the terminals of said load line holder being seated in the ends of said niches remote from said eye and the intermediate portion of said load line holder being suspended beneath said terminal member and in alignment therewith when the draft hook is suspended from a draft element.

2. The construction set forth in claim 1 in which said bail terminals comprise spherical knobs snugly fitting the closed ends of said niches.

3. The construction set forth in claim 2 in which the closed ends of said niches are spherically rounded snugly to receive said knobs.

4. The construction set forth in claim 1 in which said partition comprises a thick portion adjacent the closed ends of the niches and a thin portion adjacent said eye, the transition between the two portions being gradual.

5. The construction set forth in claim 4 in which said flanges taper in thickness from said partition progressively from the closed ends of the niches toward said eye and the arms of the flanges flare away from each other toward said eye so that the open ends of the niches are wider and more open than their closed ends.

6. The construction set forth in claim 1 in which said eye is formed with a trefoil opening, the thickness of the eye adjacent at least one arm of the opening being thinner than remaining portions of the eye and of less thickness than the distance between confronting surfaces of the spherical knobs of said load line holder.

7. The construction set forth in claim 6 wherein said trefoil opening comprises an upright arm and two horizontal arms, said upright arm extending away from said niches and said horizontal arms terminating above the upper ends of said flanges, and the distance between the confronting surfaces of said horizontal arms being slightly less than the length of a terminal of said load line holder.

8. A draft hook comprising a rigid, draft line terminal member and a rigid, load line holder mounted thereon, means at one end of said member for securing said draft hook to a draft device, said terminal member comprising a central partition at its other end and a pair of U-shaped flanges extending outwardly in opposite directions from said partition and defining therewith a pair of oppositely facing niches of U-shape in cross section, said niches being open at their ends adjacent said means and closed at their opposite ends, and said holder comprising a bail having its terminals pointing inwardly toward each other and ending in spherical knobs spaced apart to permit snug entry of said partition between them, the knobs of said load line holder being snugly seated in the ends of said niches remote from said eye and the intermediate portion of said load line holder being suspended beneath said terminal member and in alignment therewith when the draft hook is suspended from a draft device.

References Cited in the file of this patent

UNITED STATES PATENTS

| | | |
|---|---|---|
| 800,561 | Feild | Sept. 26, 1905 |
| 2,302,198 | Ehmann | Nov. 17, 1942 |
| 2,803,486 | Larson et al. | Aug. 20, 1957 |

FOREIGN PATENTS

| | | |
|---|---|---|
| 686,130 | France | Apr. 8, 1930 |